A. E. HOPLEY.
ICE CREAM FREEZER.
APPLICATION FILED SEPT. 28, 1908.
942,260.
Patented Dec. 7, 1909.
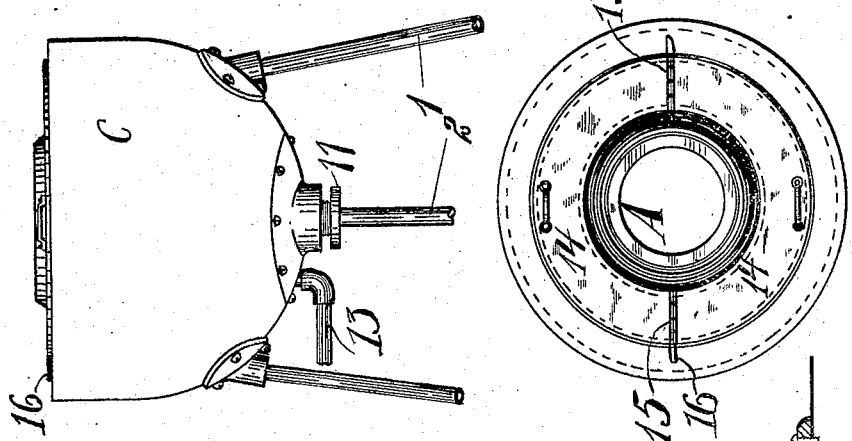
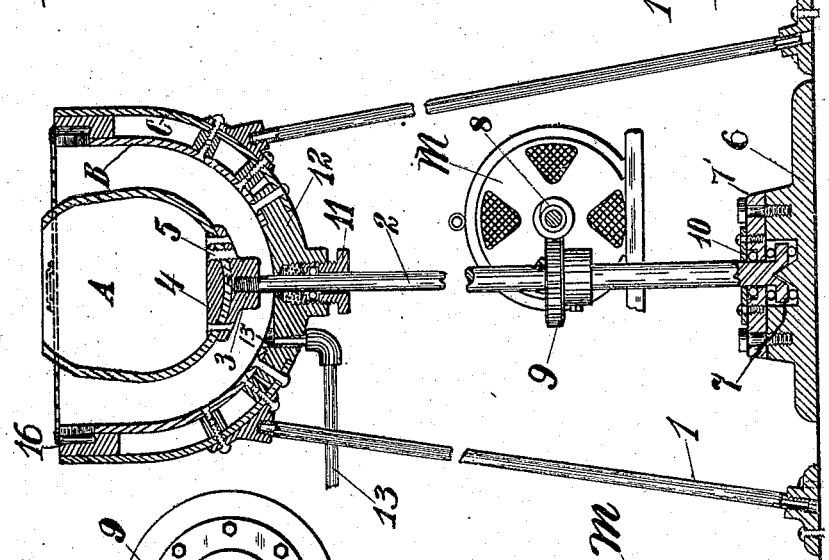
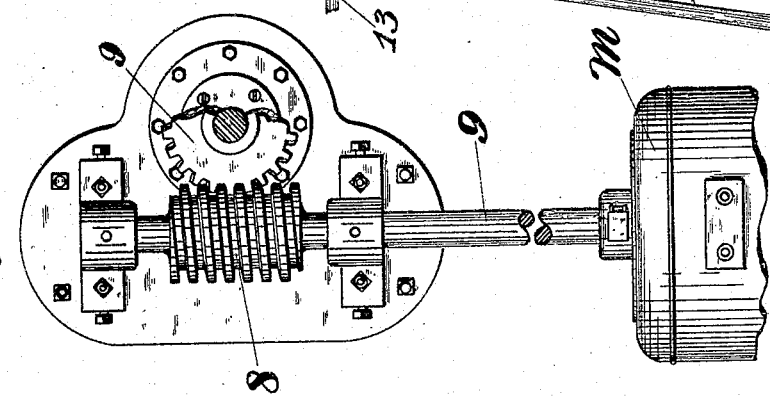
Witnesses
David Solari
Inventor
Albert E. Hopley
Attorneys
Medina and Griffin

UNITED STATES PATENT OFFICE.

ALBERT E. HOPLEY, OF HAYWARD, CALIFORNIA.

ICE-CREAM FREEZER.

942,260.  Specification of Letters Patent.  Patented Dec. 7, 1909.

Application filed September 28, 1908. Serial No. 455,120.

*To all whom it may concern:*

Be it known that I, ALBERT E. HOPLEY, a citizen of the United States, residing at Hayward, in the county of Alameda and State of California, have invented a new and useful Ice-Cream Freezer, of which the following is a specification in such full and clear terms as will enable those skilled in the art to construct and use the same.
This invention relates to an ice cream freezer, the object of which is to produce a frozen cream which is very light and frothy, and which will be frozen in the full view of the onlookers, thus making it attractive for fairs and places where the public congregates.

Another object of the invention is to produce a device which will be able to resist the thrust placed on the cream receptacle without injury to the bearings and the main shaft, since the packed ice tends to lift the cream receptacle very strongly when the same is rotating.

In the drawings, in which the same character of reference is applied to the same portion throughout, Figure 1 is a side elevation of the freezer, the legs being cut off, Fig. 2 is a plan view of the freezer, the legs not being shown, Fig. 3 is a vertical sectional view of the freezer, the step bearing and the lower parts of the freezer being shown on a larger scale than the upper parts thereof for the sake of showing the step bearing and its parts clearly, and Fig. 4 is a plan view of the step bearing and motor the legs and upper parts of the freezer not being shown.

The numeral 1 is applied to the legs which support the cream and ice receptacles.

C is the outer wall of the ice receptacle and B the inner wall thereof some kind of insulation being placed between the two walls to prevent the undue waste of ice, which latter is placed in the receptacle B and surrounds the cream receptacle A. The cream receptacle is secured on the upper end of the shaft 2 by means of the casting 3 into which the said shaft is threaded, a plate 4 being used to transmit the strain from the rivets to the cream receptacle, since the latter must be made of some material like tin which will not be effected by the action of the sweetened cream, and which is not a very strong metal. The receptacle A has the drain plug 5 which passes through the plate 4 and casting 3 in order that the cream receptacle may be cleaned when necessary.

The lower end of the shaft 2 rests in the step bearing 6 and has a flange 7. Balls are placed in the step bearing above and below this flange, the object being to make the running of the cream receptacle as light as possible, the upper set of balls acting to take up the upward thrust of the shaft when the ice receptacle is filled with packed ice, the flange, or plate, 7' holding the cream receptacle down to its proper place. The side thrust of the shaft due to the driving through the worm 8 on the shaft of the motor M of the worm wheel 9, is taken up by a set of balls placed in a groove cut in the top of the plate 7', said set of balls being held in place by means of a small plate 10. A second set of balls is placed in a groove in the gland 11, said gland performing the double function of holding the balls in their proper place and of holding the packing in the base plate 12, to the latter of which are secured the ice receptacle B and the insulating receptacle C.

The ice receptacle is drained by means of the pipe 13 which is threaded into the bottom of the base plate 12, said base plate having a portion cut down as shown at 13' to allow all the water to pass out of the machine.

The space between the cream and the ice receptacles is covered with the semi-annular plates 14, which are hinged together at 15 and are supported in place by means of the brackets 16, the ends of said brackets being placed in holes in the top blocks spacing B and C.

The operation of the device is simple, the cream is placed in the inner receptacle and the motor is started, the cream receptacle revolves rapidly, about 90 times per minute, and the cream is beaten to a froth by a long handled scraper which the operator holds in his hand and places in the cream. When the cream has been frozen the machine may be stopped, or it may be taken out when the same is running. The main object to be attained is the freezing of the mixture in the presence of the air in order that it may take up enough air to cause it to become light and fluffy, a thing that will not occur with the common style of closed freezers in which the cream has access to only a small amount of air in an almost air tight receptacle.

Having thus described my invention what I claim as new and desire to secure by Let- ters Patent of the United States is as follows:

In an ice cream freezer, a fixed insulated receptacle having a drain opening, a revoluble cream receptacle having a drain opening, a shaft passing through the first receptacle and supporting the cream receptacle, a packing gland for the shaft where it passes through the bottom of the outer receptacle, a step bearing for the shaft, a bearing adapted to prevent the shaft and inner receptacle from rising out of their places, and a cover for the space between the inner and outer receptacles, said cover being made in two pieces and hinged together.

In testimony whereof I have set my hand this 19th day of September A. D. 1908, in the presence of the two subscribed witnesses.

ALBERT E. HOPLEY.

Witnesses.
  W. T. Hess,
  C. P. Griffin.